United States Patent [19]

Tomari et al.

[11] Patent Number: 4,778,523
[45] Date of Patent: Oct. 18, 1988

[54] PROCESS FOR USING STEELMAKING SLAG

[75] Inventors: Masao Tomari; Jutaro Yoshimori, both of Fukuoka, Japan

[73] Assignee: Nippon Magnetic Dressing Co., Ltd., Kitakyushi, Japan

[21] Appl. No.: 67,429

[22] Filed: Jun. 24, 1987

Related U.S. Application Data

[63] Continuation of Ser. No. 892,876, Jul. 28, 1986, abandoned, which is a continuation of Ser. No. 800,016, Nov. 20, 1985, abandoned.

[51] Int. Cl.$^4$ ................................................ B22F 1/00
[52] U.S. Cl. .......................................... 75/256; 75/24; 75/257
[58] Field of Search ...................... 75/256, 3, 24, 4, 5, 75/25, 257

[56] References Cited

U.S. PATENT DOCUMENTS 2,417,493 3/1947 Holz ........................................ 75/25
3,849,117 11/1974 Philpotts ................................ 75/24

*Primary Examiner*—Peter D. Rosenberg
*Attorney, Agent, or Firm*—Jordan and Hamburg

[57] ABSTRACT

A process for making a binder from steelmaking slag. About 5-30 wt. % of a reforming agent selected from the group consisting of silicate rock, mineral, calamine, glass waste, foundry waste sand, waste brick, red mud, volcanic spouting matter, blast furnace slag, desilica slag, iron oxide and mixtures thereof is added to a molten steelmaking slag, causing a molten reaction forming a reacted steelmaking slag. The reacted steelmaking slag is rapidly cooled to form a powder. Iron is removed from the powder and the powder is then mixed with from about 3-5 wt. % of a powder selected from the group consisting of lime, plaster, cement and mixtures thereof, which can then be used as a binder for pellets or briquettes.

14 Claims, No Drawings

PROCESS FOR USING STEELMAKING SLAG

This application is a continuation of application Ser. No. 892,876, filed July 28, 1986, said Ser. No. 892,876 being a continuation of application Ser. No. 800,016, filed Nov. 20, 1985, both now abandoned.

BACKGROUND OF THE INVENTION

The present invention relates to a process for using steelmaking slag which is produced but not disposed of, wherein the steelmaking slag is used as a binder for pellets or briquettes.

Steelmaking slag usually contains $2CaO.SiO_2$, $F.CaO$, $F.MgO$, $2CaO.Fe_2O_3$, $4CaO.Al_2O_3Fe_2O_3$, $Fe_2O_3$, $Fe_3O_4$ and $FeO$, etc. The steelmaking slag is received by a cinder plate and is discharged. $2CaO.SiO_2$ causes expansion and collapse at the time of converting $\beta \rightarrow \gamma$ and $F.CaO$ or $F.MgO$ contained as components also cause expansion and collapse. Therefore, most steelmaking slags are disposed of without reclamation.

Cement or briquette are used as a binder for pellets or briquettes since powder ore having a lower viscosity is used in steel material. However, it takes a long time to harden with small amount of binder, the latter treatment is inconvenient, and the yield rate of products is low. Addition of a lot of binder causes a lowering of the quality of iron in the pellet or briquette.

SUMMARY OF THE INVENTION

It is an object of the present invention to improve the steelmaking slag, which is an unused natural resource. The steelmaking slag is used as a binder which rapidly hardens just after adding and mixing at the time of producing pellets of briquettes.

Another object of the present invention is achieved by adding 5-30 wt.% of a reforming agent consisting of one or more groups of silicate rock, mineral, calamine, glass waste, foundry waste sand, waste brick, red mud, volcanic spouting matter, blast furnace slag, desilicate slag and iron oxide to molten steelmaking slag, to produce a molten reaction, then rapidly cooling the reacted molten steelmaking slag, treating the cooled product to remove iron and finally mixing the resulting steelmaking powder and 3-5 wt.% of powder consisting of one or more groups of lime, plaster and cement. A proper amount of cement clinker can also be added to the mixed powder.

DESCRIPTION OF THE PREFERRED EMBODIMENTS

First, the reforming agent consisting of silicate rock or minerals is added to a molten slag having a high sensitive heat, and the molten reaction takes place by virtue of the high sensitive heat of the molten steelmaking slag. Adding the reforming agent is not restricted if the mixed powder is mixed enough. Charging granular or powdery reforming agent with bubbling gas into the molten steelmaking slag by a lanspipe is especially preferable in improving the molten reaction. Addition of the reforming agent lowers the melting point and viscosity of the steelmaking slag, and facilitates a rapid and sufficient subsequent cooling. The mineral composition is changed from $\alpha'-\beta-2CaO.SiO_2$ to $2CaO.SiO_2-2CaO.MgO.2SiO_2$, and is steadied after the rapid cooling because glass becomes the main composition. Less than 5 wt.% of the reforming agent does not result in any particular improvement in the above-mentioned mineral composition of the steelmaking slag, or lowering of the melting point and viscosity. It is preferable that the molten reaction only take place due to the sensitive heat of the steelmaking slag because of operation efficiency and economic considerations. Therefore, 30 wt.% maximum reforming agent is preferable for the abovementioned reasons. Rapid cooling by the water throwing system is usually used after the molten reaction with the reforming agent. Iron contained in the steelmaking slag is recovered by magnetic dressing or other proper processes. The treated steelmaking slag is thus obtained. Suitable grinding is carried out at the time of recovering iron because iron and other matter are separated. The resulting treated steelmaking slag can be finely ground before or after adding one or more of lime, plaster and cement. The particle size is preferably as small as possible. The brain value is more than $3200 \text{ cm}^2/\text{g}$.

A three (3) wt.% minimum of lime, plaster and cement is required for mixing with the treated steelmaking slag. Otherwise, the hardening ability of the mixed powder becomes low, it takes a long time to harden, and the maximum hardening degree is low. However, over 5 wt.% does not adversely affect the hardening ability, but the quality of iron in the pellet or briquette becomes low. Therefore, between 3 and 5 wt.% lime, plaster, or cement is preferable.

Embodiments and results will now be shown.

Table 1 shows the chemical analytical values of the raw materials used in the embodiments.

TABLE 1

| Material | Ig. Loss | $SiO_2$ | $Al_2O_3$ | T.Fe | CaO | MgO | MnO | $Na_2O$ | $K_2O$ | Collapse Values (%) | Remarks |
| --- | --- | --- | --- | --- | --- | --- | --- | --- | --- | --- | --- |
| Steelmaking slag (A) | +2.5 | 9.9 | 1.0 | 21.5 | 43.5 | 6.7 | 4.6 | 0.2 | 0.0 | 35.0 | Converter slag |
| Steelmaking slag (B) | +0.9 | 19.4 | 4.3 | 27.5 | 39.0 | 4.2 | 4.8 | 0.2 | 0.0 | 6.5 | Electric furnaces slag (oxidizing term) |
| Steelmaking slag (C) | 0.7 | 27.4 | 3.9 | 0.6 | 44.5 | 6.3 | — | 0.1 | 0.0 | 100.0 | (reducing term) |
| Blast furnace | 2.0 | 29.5 | 14.1 | 0.6 | 41.4 | 6.4 | — | 0.05 | 0.01 | 0.2 | |
| Granite | 2.3 | 70.2 | 14.5 | 3.1 | 0.9 | 0.6 | — | 2.7 | 1.9 | — | |
| Sandstone | 1.9 | 71.5 | 14.2 | 2.5 | 0.6 | 0.5 | — | 2.9 | 0.9 | — | |
| Slate | 6.6 | 63.3 | 15.5 | 4.3 | 1.7 | 1.3 | — | 1.1 | 0.9 | — | |
| Sand (river sand) | 0.2 | 87.2 | 3.1 | 0.2 | 0.2 | 0.1 | — | 1.1 | 0.3 | — | |
| Calamine | +3.3 | 29.0 | 17.4 | 28.7 | 12.1 | 2.8 | — | — | — | — | |
| Glass waste | — | 73.0 | 2.0 | 0.4 | 5.8 | 3.4 | — | 14.7 | 0.5 | — | |
| Foundry waste sand | 5.3 | 86.1 | 3.0 | 0.2 | 2.0 | 0.1 | — | 1.0 | 1.1 | — | |
| Coal ash | — | 55.9 | 26.0 | 3.6 | 5.4 | 2.0 | — | — | — | — | |
| Dequartzite | — | 29.6 | 12.3 | 7.6 | 32.5 | 4.5 | — | 0.2 | 0.0 | — | |

TABLE 1-continued

| Material | Ig. Loss | SiO$_2$ | Al$_2$O$_3$ | T.Fe | CaO | MgO | MnO | Na$_2$O | K$_2$O | Collapse Values (%) | Remarks |
|---|---|---|---|---|---|---|---|---|---|---|---|
| slag | | | | | | | | | | | |
| Iron ore (A) | — | 1.5 | 1.2 | 63.5 | — | — | — | — | — | — | |

Steelmaking slags (A), (B), and (C) in Table 1 above show the composition of steelmaking slags from which iron is recovered. The collapse values were calculated under the conditions of 20 Kg/cm$^2$, 200° C., 3 hours and 10–25 mm based on the ASTM method, and the results show less than 10 mm of collapsed matter.

Table 3 shows the results in which the melting heat of each mixture shown in the following Table 2 was determined with materials shown in Table 1 by the Seger Cone method.

the cooled mixture was dried again. The dried mixture was then ground to under 200 mesh, 3 wt.% of lime was mixed to the ground mixture with water, and the mixture was then closed up in a vinyl sack.

Table 4 shows the harden-state of the mixtures.

TABLE 4

| | Sample No. | | | | | | | | | | | | | | | | | | | | | raw material | | Blast furnace cooled by water (products on market) |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | No. 1 | No. 2 | |
| Hardening State | | | | | | | | | | | | | | | | | | | | | | | | |
| 1 day later | Δ | Δ | ○ | ○ | ○ | ○ | ○ | ○ | ○ | ○ | ○ | ○ | ○ | ○ | ○ | ○ | ○ | Δ | ○ | ○ | ○ | x | x | Δ |
| 3 days later | ○ | ○ | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ | x | x | ○ |
| 7 days later | ○ | ○ | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ | ◉ | x | x | ◉ |

In Table 4, symbol ◉ means 'very hard' pushing with a hand, symbol ○ means 'hard', symbol Δ means 'a little hard', and symbol X means 'non-harden'.

Samples No. 1 and No. 2, which were not rapidly cooled with water, were not completely hardened, as

TABLE 2

| Material | Sample | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| Steelmaking slag (A) | 100 | | 95 | 90 | 80 | 80 | 85 | 90 | 80 | 80 | 85 | | | | | | | | | | |
| Steelmaking slag (B) | | 100 | | | | | | | | | | 90 | 80 | 90 | 85 | 80 | 80 | | | | |
| Steelmaking slag (C) | | | | | | | | | | | | | | | | | | 100 | 95 | 90 | 90 |
| Granite | | | | 5 | 10 | 20 | 5 | | | | | | | | | | | | 5 | | |
| Sandstone | | | | | | | 5 | | | | | 10 | 20 | | | | 10 | | | 10 | |
| Slate | | | | | | | | 10 | | | 20 | 5 | | | | 5 | | | | | |
| Sand | | | | | | | | | 10 | | | | | | 10 | | | | | | |
| Coal ash | | | | | | | | | 5 | | | | | | | 5 | | | | | |
| Dequartzite slag | | | | | | | | | | 10 | | | | | | | 5 | 5 | | | |
| Iron ore (A) | | | | | | | | | | | | 5 | | | | | | | | | |
| Glass waste | | | | | | | | 5 | | 5 | | | | | | | | | | | |
| Calamine | | | | | | | | 5 | | | | | | | | | 5 | | | | |
| Foundry waste sand | | | | | | | | | | 10 | | | | | | 5 | 10 | | | | |

TABLE 3

| | Sample No. | | | | | | | | | | |
|---|---|---|---|---|---|---|---|---|---|---|---|
| | 1 | 2 | 3 | 4 | 5 | 6 | 7 | 8 | 9 | 10 | 11 |
| Melting-temperature (°C.) | 1520 | 1505 | 1315 | 1295 | 1290 | 1290 | 1300 | 1295 | 1230 | 1290 | 1235 |
| | Sample No. | | | | | | | | | | |
| | 12 | 13 | 14 | 15 | 16 | 17 | 18 | 19 | 20 | 21 | |
| Melting-temperature (°C.) | 1290 | 1285 | 1290 | 1285 | 1280 | 1270 | 1550 | 1320 | 1295 | 1290 | |

The examples show that steelmaking slags No. 1, No. 2, and No. 18, which have high melting points by themselves, become mixtures having low melting points by adding the reforming agent as shown in Table 3.

Next, the mixtures in Table 2 were dried in an isothermal dryer furnace at 105°–110° C. for more than 24 hours, the dried mixture was dissolved in a Sliconit electric furnace at 1500° C., the dissolved mixture was taken out from the furnace and was cooled in water, and shown in Table 4. Other samples which were rapidly cooled with the reforming agent started to harden in the early steps. Most samples cooled with the reforming agent were made of glass, and β and α'-2Ca.SiO$_2$ existed.

Embodiments of the present invention will now be described.

EMBODIMENT I

Non-viscous powder ore (particle size is shown in Table 5) was compressed and was used as a binder.

Mixing proportions for 19 specimens are shown in Table 6.

A concrete compression tester (100 t) was used for pretesting, and the mixture was molded by the tablet method ($32\phi \times 35$ mm, molding pressure $1t/cm^2$, water for addition 4.5%).

Table 7 shows the crushing strength for various specimens with the passage of time from 3 minutes to 4 days.

Considerable mixture was produced by a briquette apparatus ($50 \times 50 \times 32$ mm, water for addition 5%, lineage pressure 3.3t/cm).

Table 8 shows the producing yield rate and the crushing strength required for breaking, etc.

TABLE 5

| Particle size (mm) | +10 | 10–7 | 7–5 | 5–3 | 3–2 | 2–1 | 1–0.5 | 0.5–0.25 | 0.25–0.125 | 0.125–0.105 | –0.105 | Total |
|---|---|---|---|---|---|---|---|---|---|---|---|---|
| wt. (%) | 0.61 | 8.01 | 14.29 | 10.14 | 6.32 | 12.36 | 7.88 | 7.97 | 13.16 | 4.53 | 14.73 | 100.00 |

TABLE 6

| | Mixing proportion (wt. %) | | | | |
|---|---|---|---|---|---|
| Specimen | Sample Mixing No. / proportion | Cement clinker | Lime | Plaster | Cement |
| 1 | 1 / 97 | | 3 | | |
| 2 | 2 / 97 | | 3 | | |
| 3 | 18 / 97 | | 3 | | |
| 4 | 4 / 97 | | 3 | | |
| 5 | 12 / 97 | | 3 | | |
| 6 | 21 / 97 | | 3 | | |
| 7 | 4 / 97 | 92 | 0.5 | 2.5 | |
| 8 | 5 / 4 / 10 | 87 | 3 | | |
| 9 | 4 / 30 | 67 | 0.5 | 2.5 | |
| 10 | 12 / 5 | 92 | 0.5 | 2.5 | |
| 11 | 12 / 10 | 87 | 0.5 | 2.5 | |
| 12 | 21 / 5 | 92 | 0.5 | 2.5 | |
| 13 | 21 / 10 | 87 | 0.5 | 2.5 | |
| 14 | 21 | 47 | 0.5 | 2.5 | |
| 15 | 50 / 4 / 97 | | | | 3 |
| 16 | 4 / 5 | | | | 95 |
| 17 | 12 / 97 | | | | 3 |
| 18 | 12 / 10 | | | | 90 |
| 19 | 21 / 5 | | | | 95 |

Sample Numbers in Table 6 are the same numbers as in Table 2.

The mixtures in specimens No. 1–No. 14 shown in Table 6 were ground by a ballmill to $3100 \pm 50$ $cm^2/g$ brain value, portland cement available on the market was added to the ground samples, and specimens No. 15–No. 19 were thus obtained.

TABLE 7

| | Mixing proportion (wt. %) | | Specimen (No.) (Proportion) | | Crushing strength (Kg/peace) | | | | | | | |
|---|---|---|---|---|---|---|---|---|---|---|---|---|
| Test No. | Powder ore | Plain cement | | Bentonite | 3 mins | 6 mins | 9 mins | 15 mins | 1 day | 2 days | 3 days | 4 days |
| 1 | 95 | 5 | | | 38 | 41 | 45 | 48 | 393 | 440 | 1117 | 1365 |
| 2 | 95 | | 1 / 5 | | 42 | 46 | 49 | 56 | 470 | 620 | 735 | 865 |
| 3 | 95 | | 3 / 5 | | 49 | 55 | 58 | 61 | 505 | 670 | 787 | 890 |
| 4 | 95 | | 4 / 5 | | 48 | 56 | 57 | 60 | 510 | 675 | 790 | 900 |
| 5 | 95 | | 5 / 5 | | 47 | 49 | 51 | 59 | 495 | 650 | 785 | 890 |
| 6 | 95 | | 6 / 5 | | 49 | 54 | 59 | 62 | 500 | 670 | 780 | 880 |
| 7 | 92 | 5 | | 3 | 42 | 47 | 52 | 53 | 777 | 890 | 1013 | 1087 |
| 8 | 92 | | 1 / 5 | 3 | 49 | 50 | 59 | 67 | 573 | 670 | 790 | 825 |
| 9 | 92 | | 3 / 5 | 3 | 52 | 55 | 63 | 72 | 625 | 705 | 815 | 951 |
| 10 | 92 | | 5 / 5 | 3 | 49 | 51 | 59 | 67 | 575 | 670 | 795 | 840 |
| 11 | 92 | | 6 / 5 | 3 | 51 | 53 | 60 | 70 | 600 | 690 | 805 | 925 |
| 12 | 92 | | 7 / 5 | 3 | 39 | 41 | 44 | 49 | 420 | 590 | 1150 | 1305 |
| 13 | 95 | | 9 / 5 | | 39 | 42 | 48 | 50 | 450 | 465 | 1050 | 1355 |
| 14 | 92 | | 9 / 5 | 3 | 41 | 43 | 49 | 52 | 435 | 450 | 1010 | 1250 |
| 15 | 95 | | 12 | | 39 | 41 | 47 | 49 | 445 | 470 | 1040 | 1405 |

TABLE 7-continued

| Test No. | Mixing proportion (wt. %) Powder ore | Plain cement | Specimen (No.) (Proportion) | Bentonite | Crushing strength (Kg/peace) 3 mins | 6 mins | 9 mins | 15 mins | 1 day | 2 days | 3 days | 4 days |
| --- | --- | --- | --- | --- | --- | --- | --- | --- | --- | --- | --- | --- |
| 16 | 92 |  | 5 12 | 3 | 42 | 43 | 49 | 51 | 505 | 570 | 1070 | 1415 |
| 17 | 95 |  | 5 14 |  | 44 | 46 | 51 | 54 | 430 | 460 | 985 | 1100 |
| 18 | 92 |  | 5 14 | 3 | 43 | 44 | 51 | 53 | 440 | 470 | 1010 | 1260 |
| 19 | 92 | 3 | 5 1 | 2 | 47 | 49 | 54 | 60 | 610 | 705 | 740 | 1025 |
| 20 | 92 | 3 | 3 11 | 2 | 44 | 45 | 50 | 57 | 605 | 720 | 730 | 1020 |
| 21 | 92 | 4 | 3 14 | 2 | 46 | 47 | 52 | 60 | 620 | 715 | 745 | 1153 |
| 22 | 92 |  | 2 15 | 3 | 38 | 40 | 46 | 46 | 440 | 460 | 1020 | 1320 |
| 23 | 92 |  | 5 16 | 3 | 40 | 42 | 47 | 49 | 445 | 465 | 1015 | 1325 |
| 24 | 95 |  | 5 15 |  | 39 | 41 | 48 | 49 | 500 | 560 | 1065 | 1300 |
| 25 | 95 |  | 5 17 |  | 43 | 45 | 52 | 54 | 435 | 465 | 990 | 1100 |
| 26 | 92 |  | 5 17 | 3 | 42 | 43 | 50 | 52 | 445 | 475 | 1005 | 1255 |
| 27 | 95 |  | 5 18 |  | 44 | 46 | 50 | 51 | 610 | 715 | 735 | 1050 |
| 28 | 95 |  | 5 19 5 |  | 43 | 44 | 51 | 53 | 615 | 710 | 740 | 1150 |

TABLE 8

| Test No. | Crushing strength*1 (Kg/peace) 2 days | 5 days | Dropping strength*2 (No. of times) 3 days | 5 days | Producing yield rate (%) | Addition of water (%) |
| --- | --- | --- | --- | --- | --- | --- |
| 1 | — | — | — | — | 30 | 5 |
| 3 | 75 | 290 | 9 | 17 | 55 | 5 |
| 6 | 85 | 320 | 16 | 22 | 75 | 5 |
| 12 | 90 | 385 | 17 | 26 | 76 | 5 |
| 15 | 85 | 370 | 16 | 26 | 80 | 5 |
| 16 | 90 | 330 | 17 | 27 | 85 | 5 |
| 19 | 90 | 400 | 17 | 27 | 93 | 5 |
| 22 | 87 | 340 | 17 | 24 | 75 | 5 |
| 24 | 84 | 365 | 17 | 25 | 78 | 5 |
| 26 | 90 | 325 | 17 | 27 | 86 | 5 |
| 27 | 90 | 385 | 17 | 27 | 89 | 5 |

*1Strength in which briquette is pressed to mark direction until briquette is broken down.
*2The number of times in which a briquette is dropped from a height onto an iron plate having a 10 mm thickness, until it is broken down to ½ its original size.

Left side test numbers in Table 8 are the same numbers as in Table 7, the same numbers show the same mixing proportions.

From the results of Embodiment I, it can be seen that it takes few days to have enough strength after mixing cement in Test No. 1 and cement and bentonite in Test No. 2 to produce a briquette with the powder ore. Test No. 3, using Sample 18, in which the reforming agent is not added, shows a weak dropping strength. In the present invention, considerably great strength is observed directly after the mixing, and is an advantage of the present invention. Therefore, it will be appreciated that enough durability is obtained directly after the mixing and the producing yield rate is a high percentage, as shown in Table 8.

EMBODIMENT II

Iron ore having the same mixing proportions of test numbers in Table 7 is produced to the particle sizes shown in Table 9.

Table 10 shows the pelletizing and the dropping strength of 10–5 mm pellets. The symbol "'" of the test numbers in Table 10 means the same mixing proportions as the same test numbers in Table 7 without the symbol "'".

| Particle size (μ) | +1000 | 1000–500 | 500–250 | 250–125 | 125–105 | −105 | Total |
| --- | --- | --- | --- | --- | --- | --- | --- |
| wt. (%) | 0.07 | .18 | 15.43 | 20.49 | 12.71 | 1.21 | 100.00 |

TABLE 10

| Test No. | Pelletizing | Dropping strength (No. of times)*1 | Crushing strength (Kg/peace)*2 |
| --- | --- | --- | --- |
| 1' | impossible | — | — |
| 7' | impossible | — | — |
| 3' | impossible | — | — |
| 6' | good | 29 | 86 |
| 9' | good | 30 | 95 |
| 11' | good | 37 | 99 |
| 14' | good | 31 | 93 |
| 17' | good | 41 | 120 |
| 20' | good | 32 | 99 |
| 21' | good | 36 | 105 |

*1The number of times in which, 3 days later, pellets are dropped from a 1 m height onto an iron plate having a 10 mm thickness, and are broken down to ½ their size.
*2Crushing strength, 3 days later.

The pelletizing of Test No. 1' or Test No. 7' using cement or cement and bentonite as a binder is impossible in Embodiment II. The pelletizing of Sample No. 18 in which the reforming agent is not added and a binder of Test No. 3' in which lime is mixed are also impossible. The pelletizing of a binder consisting of a specimen contains a mixture of reforming agent, lime, plaster and cement, or a specimen mixing the above four components and cement clinker is possible, and it is also observed that dropping strength and crushing strength are satisfactory.

As mentioned above, in the present invention, steelmaking slag in the molton state is effectively reacted with silicate crag or a reforming agent consisting of minerals by using the sensitive heat of the slag, the reacted steelmaking slag is rapidly cooled, and considerably great strength is made possible by adding lime, plaster or cement, etc. It takes only 2–3 minutes to harden in producing a pellet or briquette, the quality of iron never become low because even a little amount of the binder has a considerable hardening ability, the producing yield rate is high, and the producing efficiency is also high. Cement clinker also has high hardenability, but it is preferred that cement clinker not be added, thereby producing a higher quality iron using steelmaking slag which is industrially discarded abolished matter.

What we claim are:

1. A process for making a binder from steelmaking slag, comprising:
   adding a reforming agent selected from the group consisting of silicate rock, calamine, glass waste, foundry waste sand, waste brick, red mud, volcanic spouting matter, blast furnace slag, desilica slag, iron oxide and mixtures thereof to a molten steelmaking slag in an amount ranging from about 5 to about 30% by weight of the molten steelmaking slag to lower the melting point and viscosity of the steelmaking slag and to produce a molten reaction forming a reacted steelmaking slag;
   rapidly cooling the reacted steelmaking slag to form a powder composed mainly of glass comprising $2CaO.SiO_2$ and $2CaO.MgO.2SiO_2$,
   removing iron from the powder;
   finely grinding the powder to a brain value greater than 3200 cm$^2$/g; and then
   mixing the finely-ground powder with from about 3 to about 5% by weight of the powder of an agent selected from the group consisting of lime, plaster, cement and mixtures thereof as a binder to form pellets or briquettes.

2. A process according to claim 1, further comprising mixing cement clinker with the powder in the mixing step.

3. A process according to claim 1, wherein the moletn reaction is initiated by the heat of the molten steelmaking slag.

4. A process according to claim 1, wherein the reforming agent is added to the molten steelmaking slag as a granular powder.

5. A process according to claim 1, wherein the binder agent is mixed with the powder as a powder.

6. A process according to claim 1, wherein iron is removed from the powder by magnetic dressing.

7. A process according to claim 1, wherein the reacted steelmaking slag is rapidly cooled in water.

8. A process according to claim 1 further comprising forming the binder to pellets.

9. A process according to claim 1 further comprising forming the binder into briquettes.

10. A binder composition for pellets or briquettes, comprising
    a powder ground to a brain value of greater than 3200 cm$^2$/g, said powder comprising glass formed by rapidly cooling the reaction product of molten steelmaking slag and about 5 to about 30% by weight of the steelmaking slag of a reforming agent selected from the group consisting of silicate rock, calamine, glass waste, foundry waste sand, waste brick, red mud, volcanic spouting matter, blast furnace slag, desilica slag, iron oxide and mixtures thereof, from which iron has been removed, said reaction product comprising $2CaO.SiO_2$ and $2CaO.MgO.2SiO_2$, and about 3 to about 5% by weight of the powder of an agent selected from the group consisting of lime, plaster, cement and mixtures thereof.

11. A binder composition according to claim 10, wherein the reforming agent comprises from about 5 to about 30% by weight of the molten steelmaking slag.

12. A binder composition according to claim 10 further comprising cement clinker.

13. A binder composition according to claim 10, formed into pellets.

14. A binder composition according to claim 10, formed into briquettes.

* * * * *